June 26, 1962 S. T. CARTER 3,040,870
APPARATUS FOR ADVANCING ARTICLES FROM A SUPPLY TO A RECEIVER
Filed Aug. 12, 1959 4 Sheets-Sheet 1
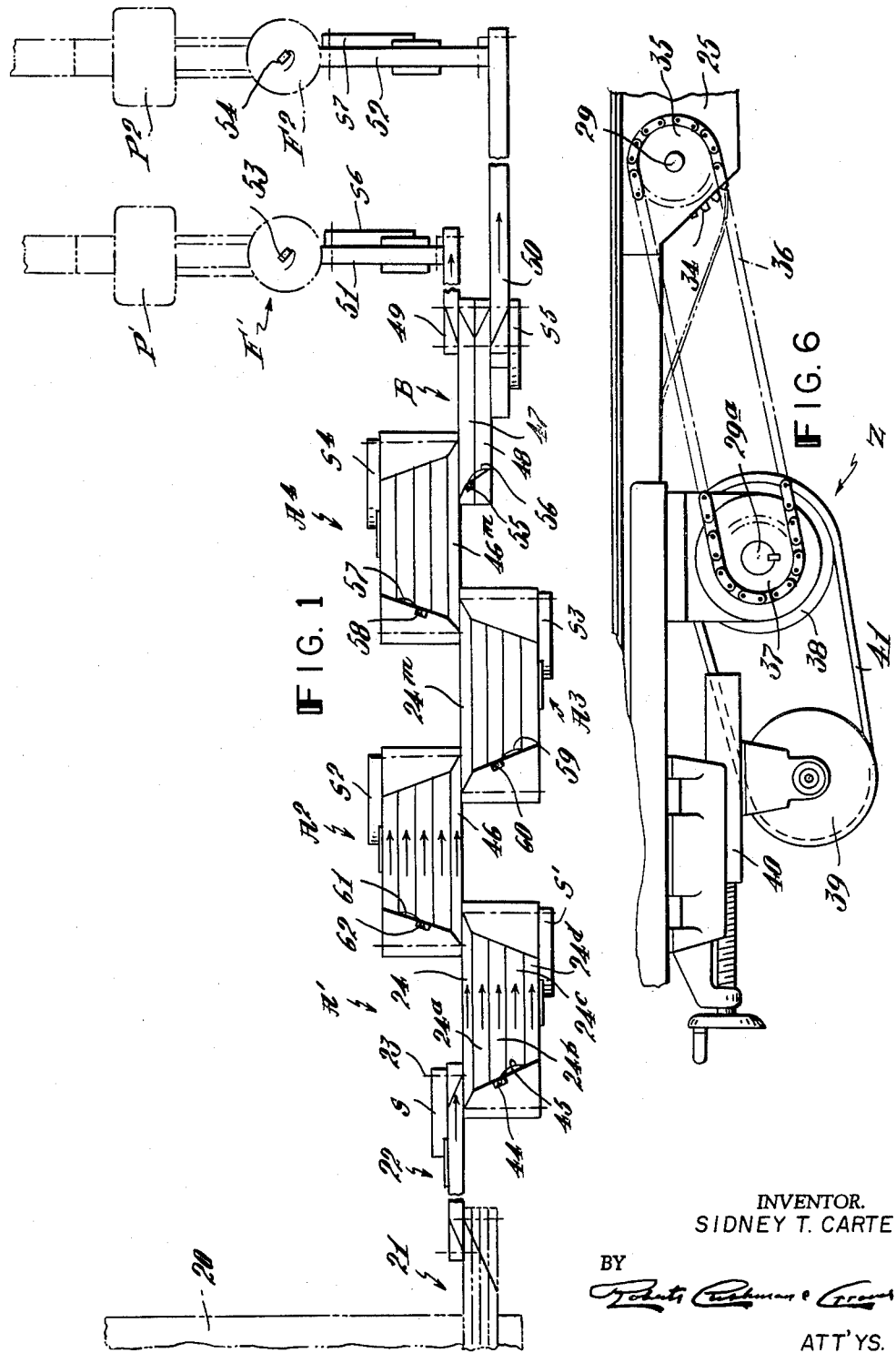
INVENTOR.
SIDNEY T. CARTER
BY
ATT'YS.

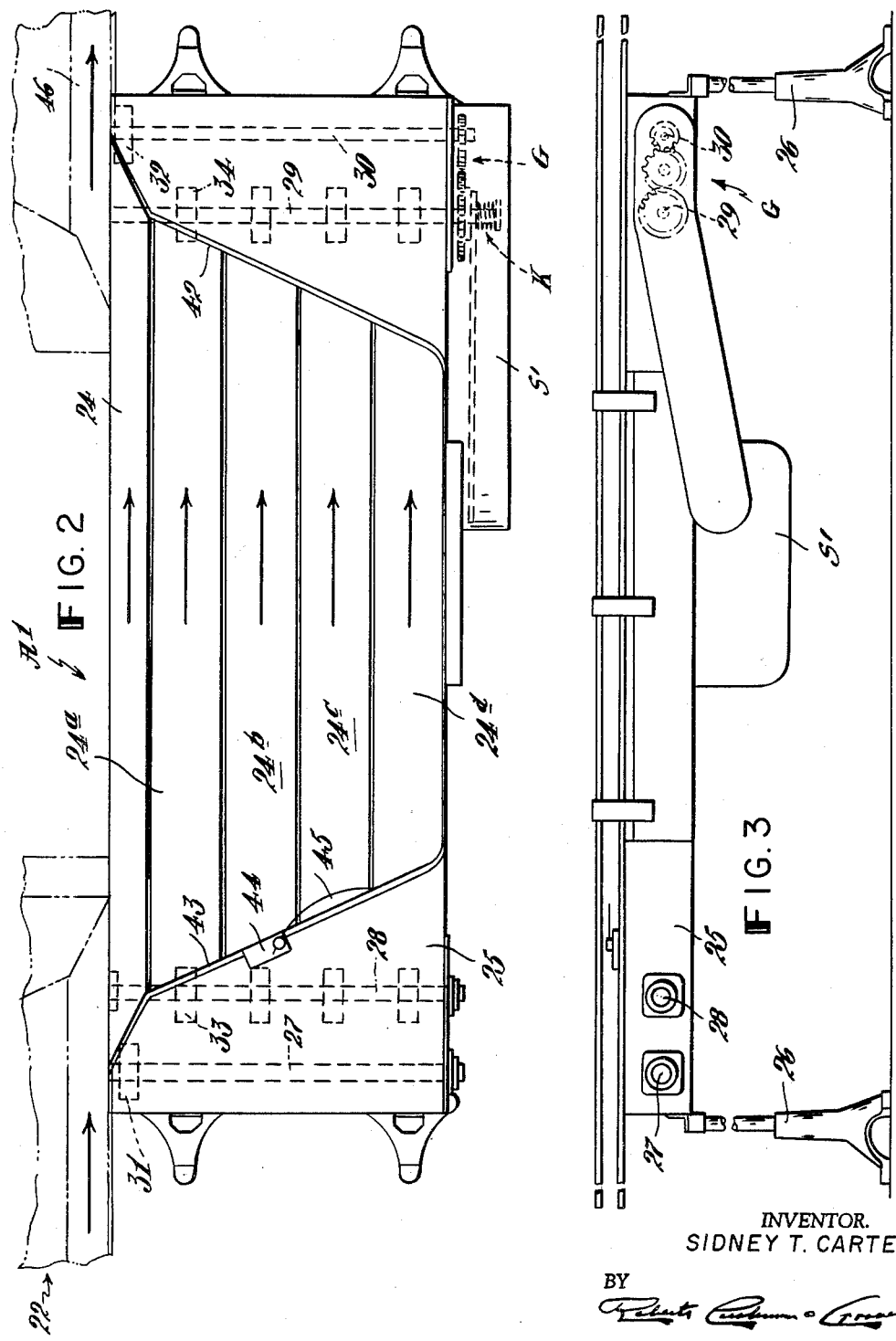

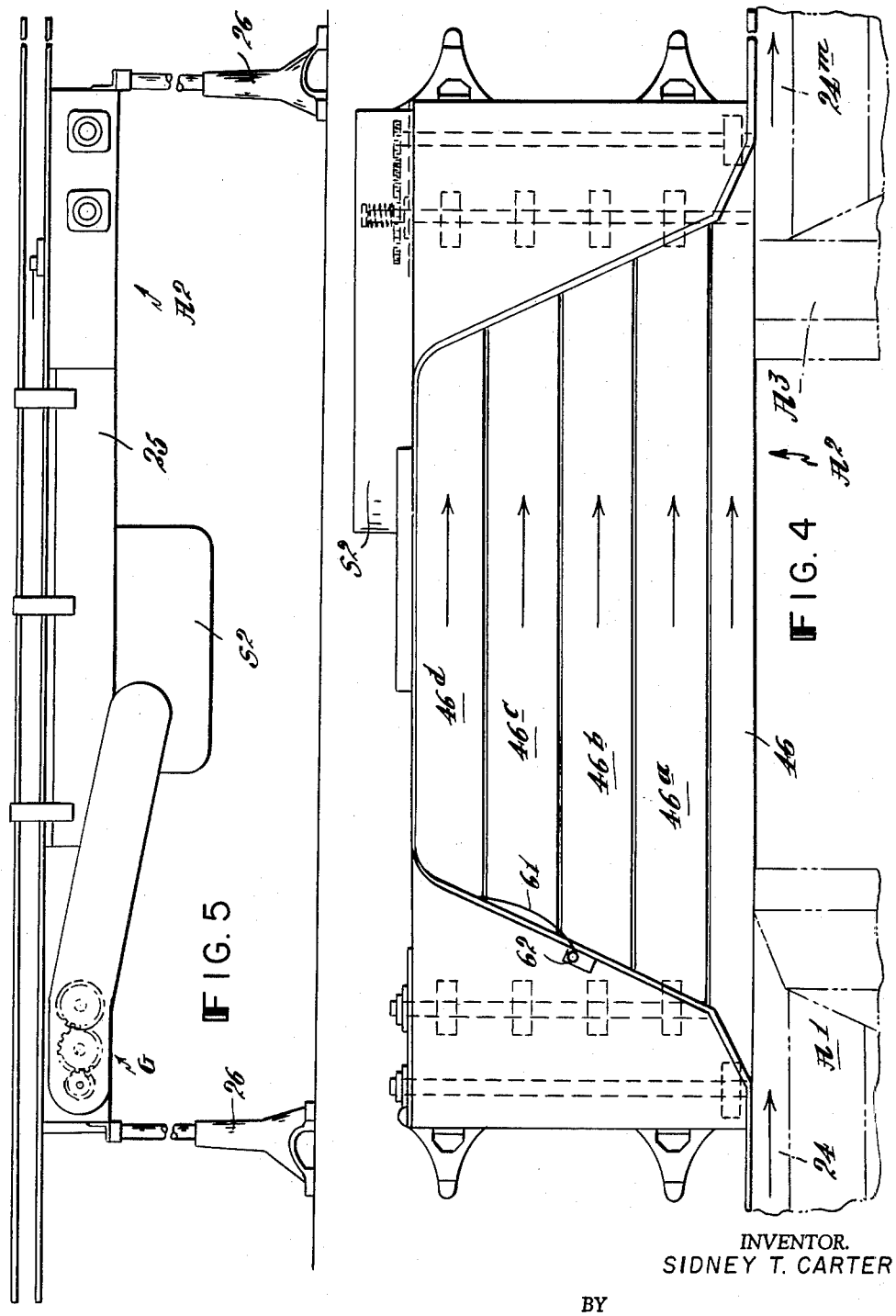

INVENTOR.
SIDNEY T. CARTER

United States Patent Office 3,040,870
Patented June 26, 1962

3,040,870
APPARATUS FOR ADVANCING ARTICLES FROM A SUPPLY TO A RECEIVER
Sidney T. Carter, Shrewsbury, Mass., assignor to Geo. J. Meyer Manufacturing Co., Cudahy, Wis., a corporation of Wisconsin
Filed Aug. 12, 1959, Ser. No. 833,164
10 Claims. (Cl. 198—76)

This invention pertains to apparatus whose intended purpose and function is to deliver articles, for example bottles or cans, advancing from a source of supply, to a receiver, for instance a processing apparatus whose capacity, in respect to the number of articles which it can handle per unit of time, is definitely limited, and relates more especially to accumulator means so devised that, if for any reason, for instance temporary stoppage, the receiver fail to take the articles as fast as they are received from the supply, the accumulator means will automatically store surplus articles and then automatically release the stored articles for delivery to the receiver as soon as the latter is capable of receiving them. One specific utility of such accumulator means as just above referred to is disclosed in the copending application for Letters Patent, Serial No. 747,444, filed July 9, 1958 by Sidney T. Carter, now Patent No. 2,936,060, dated May 10, 1960, wherein the accumulator is arranged at the supply end of combining apparatus capable of taking articles moving along in two or more definite rows, and combining them to form a single row in which the articles are arranged in tandem relation, one following another.

Such an accumulator apparatus may, for example, comprise a power-driven auxiliary conveyor onto which articles may be diverted from a normal path in the event that said normal path becomes obstructed so that the articles cannot continue to move at their normal rate. However, because, in order to accommodate a large number of articles, such an auxiliary conveyor may necessarily be made very long, the resultant pressure on the endmost article, due to the urge of the conveyor, as more and more articles are added to the receiving end of the row, may become so great as to crush the article, if it be a can, or to fracture it if it be a bottle.

One of the objects of the present invention is to provide accumulator means so devised that it may have a large capacity for storing articles, but yet without danger of the building up of a pressure upon the articles such as to injure or break them. A further object is to provide accumulator means of large capacity so devised that articles will be diverted, without danger of injury, from the normal path to form a plurality of parallel rows, no one of which is of sufficient length to cause injury to the articles forming the individual row and so that, as the normal path becomes clear, articles from successive rows on the accumulator will gradually be returned to the normal path until the accumulator is empty. A further object is to provide accumulator means with provision for driving its parallel conveyors and with means automatically operative, under certain conditions, to stop its several conveyors when the accumulator is completely filled with articles. A further object is to provide an accumulator device so devised that it may readily be assembled in series relation with other accumulator devices of the same general type, thereby to provide as great a capacity as may be wished for storage purposes. A further object is to provide an accumulator device having automatic means for stopping the drive for its several conveyors in the event that it is filled to capacity, but only if the device to which the accumulator delivers articles is stopped. A further object is to provide conveyor means wherein an accumulator normally delivers articles to a conveyor moving at a predetermined linear speed, and with automatic means operative to stop the drive for the accumulator after the accumulator is filled to capacity whenever articles back-up on the conveyor to which they are normally delivered. A further object is to provide apparatus wherein a plurality of accumulators are arranged in series, each delivering articles to the next. A further object is to provide accumulator means wherein the maximum length of any row of articles accumulated thereon does not substantially exceed seventy-two inches. A further object is to provide an accumulator apparatus which may be arranged to receive articles from a normal path located either at its right-hand or left-hand side, whereby a plurality of such accumulators may be arranged in series with the normal paths of two successive conveyors arranged to deliver articles directly from one to the other. Other and further objects and advantages of the invention will be pointed out in the following more detailed description and by reference to the accompanying drawings wherein:

FIG. 1 is a diagrammatic plan view illustrating four accumulators, according to the present invention, arranged in series, the first being designed to receive articles from a source of supply and the last of which is arranged to deliver articles to an article combiner;

FIG. 2 is a fragmentary diagrammatic plan view, to larger scale than FIG. 1, illustrating a single accumulator according to the present invention, the accumulator thus illustrated having its normal path at its left-hand side (the upper edge as it appears in the drawing), portions of a preceding supply conveyor and following accumulator being indicated in broken lines;

FIG. 3 is a side elevation diagrammatically illustrating the accumulator of FIG. 2;

FIG. 4 is a plan view of an accumulator like that of FIG. 2, except that its normal path is at its right-hand side (lower edge as seen in the drawing);

FIG. 5 is a side elevation of the accumulator of FIG. 4;

FIG. 6 is a fragmentary elevation illustrative of a generally conventional type of variable speed drive useful in the apparatus of the present invention.

Figure 7:
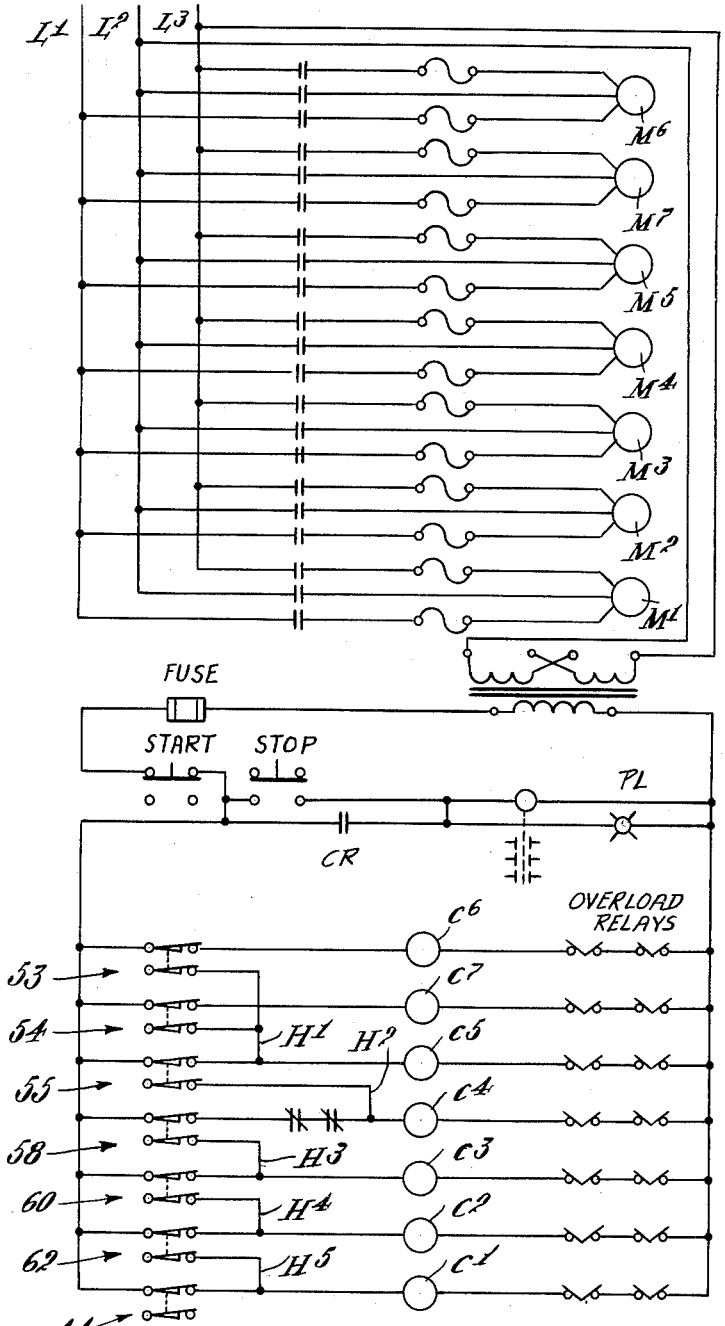
FIG. 7 is a wiring diagram illustrating one useful arrangement for controlling the drive motors for the various devices illustrated in FIG. 1.

The apparatus is herein specifically described as designed for conveying bottles from a pasteurizer to filling machines and thence to packers, but it is to be understood that the invention is not necessarily limited to the handling of bottles, nor as to the particular source of supply of the articles to be conveyed, nor to the particular receiver to which the articles are ultimately delivered.

Referring to FIG. 1, the numeral 20 designates a pasteurizer which delivers articles to a multiple-row conveyor 21, which, in turn, delivers the bottles to a conveyor 22 which is three bottles wide and which is driven by the shaft 23, which may be the shaft of an electric motor, diagrammatically indicated in FIG. 7 by the character $M^1$ or the delivery shaft of a reduction gearing which is driven by such a motor. The conveyor 22 normally delivers an uninterrupted supply of articles so as to form a single row upon the narrow conveyor 24 of the accumulator $A^1$, this conveyor 24 being, for example, 4½ inches wide and defining the normal path of articles which they follow unless, because of some stoppage or slowing down at a later part of their path of advance toward the receiver, the articles are diverted from the conveyor 24 onto auxiliary conveyors comprised in the accumulator $A^1$. The conveyors of the accumulator $A^1$ (which are auxiliary to the conveyor 24) are here designated by the characters 24a, 24b, 24c and 24d, these conveyors being parallel and closely adjacent and with their article-supporting runs in the same plane as that of the conveyor 24.

Referring to FIG. 2, which shows the accumulator $A^1$ to larger scale than FIG. 1, this accumulator comprises a frame 25 (FIGS. 2 and 3) mounted upon suitable supports 26 and having bearings at its left-hand end, as viewed in FIGS. 2 and 3, for parallel shaft 27 and 28, and at its right-hand end for parallel shafts 29 and 30. The shafts 29 and 30 are connected by gearing G (FIG. 2) so that they turn in the same direction but at different speeds. The shaft 27 carries a guide sprocket 31 for the chain of conveyor 24, and the shaft 30 carries a drive sprocket 32 for driving the chain of said conveyor 24. The shaft 28 carries guide sprockets 33, and the shaft 29 carries drive sprockets 34 for the chains of the several parallel conveyors 24a, 24b, etc. As shown in FIG. 6, the shaft 29 carries a sprocket wheel 35 which is embraced by a chain 36 which passes about a sprocket 37 on the driven shaft 29a of a speed reducing unit Z. A slip clutch K (FIG. 2) connects sprocket 35 to the shaft 29 to provide for overload conditions. The speed reducing unit Z may be of conventional type, including a second pulley 39, fixed to the shaft of a constant speed drive motor mounted upon a manually adjustable carriage 40, and with a belt 41 embracing the pulleys 38 and 39, the pulley 39 being fixed on the shaft of the drive motor mounted on the carriage 40, the arrangement being such that, by the adjustment of the carriage 40, the speed of the driven shafts 29 and 30 may be varied. While one particular form of speed-varying means is here illustrated by way of example, it is to be understood that the invention is not limited to this particular way of varying the speed of the several conveyors. In FIG. 3 the casing for the speed-varying means for accumulator $A^1$ is indicated generally by the character $S^1$ and its drive motor, as above suggested, is herein designated by the character $M^1$. Referring again to FIG. 2, the numeral 42 designates a deflector member extending diagonally across the delivery ends of the several conveyor members 24a, 24b, etc., the latter moving in the direction indicated by the arrows; while the numeral 43 designates another deflector also extending diagonally across the conveyor members at their left-hand ends as viewed in FIG. 2. Mounted upon the deflector 43 there is a switch 44 having an actuating arm 45 arranged to respond to the pressure of articles when the accumulator $A^1$ becomes substantially full, and thereby to operate the switch 44 as hereinafter more fully described. It will be apparent that when the normal discharge of articles from the conveyor 24 is blocked, then articles, crowded off of the conveyor 24 by those continuing to be advanced by the conveyor 22, will be distributed among the auxiliary conveyors 24a, 24b and 24c by the stationary deflectors 42 and 43.

Normally the main conveyor 24 of the accumulator $A^1$ delivers articles directly to the main conveyor 46 of the accumulator $A^2$ (assuming that accumulator $A^2$ is arranged in series with accumulator $A^1$), the conveyor 46 of the accumulator $A^2$ defining the normal path for articles and having associated with it, in parallel relation, the conveyors 46a, 46b, 46c and 46d which are driven by mechanism such as that above described with respect to accumulator $A^1$, including the speed-varying device $S^2$ having its own independent drive motor $M^2$ (FIG. 7). However, it will be noted that, as compared with accumulator $A^1$, the main conveyor 46 is at the right-hand side (referring to its direction of motion), while its speed-varying device $S^2$ is at the left-hand side.

Assuming that a third accumulator $A^3$ (FIG. 1) is arranged in series with the others, this accumulator $A^3$ will be identical in construction with the accumulator $A^1$, with its conveyor 24m, which defines the normal path of articles, at its left-hand side and positioned to receive articles directly from the main conveyor 46 of accumulator $A^2$, the several conveyors of accumulator $A^3$ being driven by the speed-varying device $S^3$ by the drive motor $M^3$ (FIG. 7). Assuming again that a fourth accumulator $A^4$ is embraced in the series, this accumulator $A^4$ will be identical with accumulator $A^2$, and will be arranged so that its main conveyor 46m receives articles directly from the conveyor 24m of the accumulator $A^3$ and delivers them to a duplex feeder conveyor device B, here shown as comprising two parallel conveyors 47 and 48. As here shown, the conveyors of the accumulator $A^4$ are driven by a variable speed drive $S^4$ having the drive motor $M^4$ (FIG. 7), while the conveyors 47 and 48 of the conveyor device B are driven by the variable speed device $S^5$ comprising the drive motor $M^5$ (FIG. 7). As here illustrated, the conveyors 47 and 48 deliver articles to transfer conveyors 49 and 50, respectively, and these conveyors in turn deliver the articles, by the assistance of suitable guides (not here shown) to metering conveyors 51 and 52, respectively, which are arranged at right angles to the conveyors 49 and 50. The metering conveyors 51 and 52 are driven by variable speed drives $S^6$ and $S^7$ having the drive motors $M^6$ and $M^7$ respectively. The conveyors 51 and 52 deliver the articles to filing machines $F^1$ and $F^2$ respectively, and from these machines the articles are delivered, by suitable conveyor means, to packers $P^1$ and $P^2$. The filing machines $F^1$ and $F^2$ are provided with limit switches 53 and 54 respectively, which control the variable speed drives $S^6$ and $S^7$. Desirably, the conveyors 47, 48, 51 and 52 are three-bottles wide; the conveyor 49 (being driven by the same motor) runs slightly faster than the conveyor 51, and the conveyor 50 (driven by the same motor) runs slightly faster than the conveyor 52. The metering conveyors 51 and 52 are adjusted to run at a speed equal to the maximum speed of the packers $P^1$ and $P^2$, and thus these conveyors 51 and 52 act as metering devices to prevent the delivery of bottles to the packers faster than the latter can handle them. Thus, when, for example, packer $P^1$ stops so that the corresponding filer $F^1$ becomes fully charged with bottles, its limit switch 53 is actuated thereby stopping the corresponding conveyors 51 and 49. In the same way, of course, the actuation of limit switch 54 will stop conveyors 52 and 50.

As noted above, the speed-varying means $S^5$ controls the speed of the feeder conveyor device B. At the receiving ends of the conveyors 47 and 48 there is arranged a limit switch 55 having an actuating feeler arm 56. If articles back up on the conveyor device B, this switch 55 will be actuated and the drive $S^5$ will act to stop the conveyors 47 and 48, but (as hereafter more fully described) only if the transfer conveyors 49 and 50 are not running. If either or both of these conveyors are running, the actuation of the switch 55 will not stop the conveyors 47 and 48.

The variable speed drive $S^4$ (FIG. 1) actuates the conveyors of the accumulator $A^4$. The speed of the main conveyor 46m of this accumulator is set to advance articles (arranged in a single line and with the space between successive articles varying from 0 inches to a maximum of ¼ inch) at a rate to supply the packers $P^1$ and $P^2$ to capacity. The storage conveyors of the accumulator $A^4$, which are desirably 7½ inches wide, are driven at from ⅕ to ⅛ of the speed of the main conveyor 46m. If articles back up on the conveyors 47 or 48, the articles which are being advanced by the main conveyor 46m, and which can no longer be discharged into the conveyor device B, will gradually accumulate on the slower moving auxiliary conveyors of the accumulator $A^4$. If the accumulation of articles in this accumulator continue, they will eventually press upon the arm or feeler member 57 and thereby open the normally closed switch 58, but the circuit is such that resultant stoppage of the conveyor $A^4$ will not occur unless the switch 55 has previously been actuated by the backing up of articles against the feeler 56. If, after the accumulator $A^4$ has been stopped as above suggested, articles begin to move along the conveyors 47 and 48 thus releasing the feeler 56, the drive $S^4$ will again start even though some of the articles in the accumulator A⁴ are still holding the feeler 57 in switch-actuating position.

If the accumulator A⁴ remains stopped long enough, articles will begin to accumulate in the accumulator A³; and if this becomes completely filled, then the pressure of articles therein will actuate the switch arm or feeler 59, which, by operating the switch 60, will cause the drive mechanism S³ to stop the conveyors of the accumulator A³, it being assumed at this time that the entire system is filled with bottles from the accumulator A³ to the packers P¹ and P². When the drive mechanism S⁴ again starts, the drive S³ automatically starts. If accumulator A² become completely filled with articles, the pressure of articles upon the feeler or switch arm 61 of the switch 62 will cause the drive mechanism S² to stop all of the conveyors of accumulator A² in the event that drives S³, S⁴ and S⁵ are not running. And likewise, if accumulator A¹ become completely filled with articles, then the pressure of articles upon the switch arm 45 will actuate the switch 44 and thus cause the drive S¹ to stop all of the conveyors of the accumulator A¹, providing all subsequent drives are stopped.

During normal operation, the bottles delivered by the pasteurizer conveyor 21 move uninterruptedly onto the conveyor 22, which is three-bottles wide, and then in a single row onto the conveyor 46 of the first accumulator and do not move over onto the auxiliary conveyors 24a, 24b, etc., unless, by reason of a stoppage of articles in the succeeding portion of the system, the articles are crowded off of the conveyor 24 onto the conveyors 24a, 24b, etc. When the system is either completely filled up with bottles or partially filled and one or both packers start operating, the accumulators automatically keep their exits filled with bottles until all of the auxiliary conveyors 24a, 24b, etc. are empty. As already pointed out, the longest of the conveyors of any of the accumulators is of such limited length, for example not exceeding a maximum of approximately six feet, that there is no danger of the breaking or other injury of articles because of excessive pressure as they are urged toward the exit end of the accumulators by the pressure of bottles urged on by the conveyors and coming in from the supply. At the same time, the return of the articles to the normal path in each case is facilitated and insured.

Referring to FIG. 7, which shows the electrical circuit whereby the above apparatus is controlled, the characters M⁶, M⁷, M⁵, M⁴, etc. indicate the motors for the accumulators S⁶, S⁷, S⁵, etc.; while the characters C⁶, C⁷, C⁵, etc. represent the motor starter coils for the corresponding motors. The numerals 53, 54, 55, etc. designate the switches similarly designated on FIG. 1 of the drawings.

It will be seen by reference to FIG. 7 that, although the opening of the switch 55 would, of itself, cut-off current to the motor starter C⁵ and thus stop the feeder conveyor device B, the supply of current to motor starter C⁵ will continue, even though the switch 55 be open, so long as either of the switches 53 or 54 is closed, since current will continue to be supplied to the motor starter C⁵ by the branch conductor H¹. Likewise, if switch 58 be opened so as to break the main circuit to the motor starter C⁴, current will continue to be supplied to the motor starter C⁴ (so long as switch 55 is closed) and the accumulator A⁴ will continue to run since current will be supplied to the motor starter C⁴ through the branch conductor H². In the same way, if the switch 60 be opened, the accumulator A³ will continue to run so long as the switch 58 remains closed, since current will be supplied to the motor starter C³ by the branch conductor H³. Opening of the switch 62 will not stop the accumulator A² unless switch 60 is opened at the same time, since current will continue to be supplied through the branch conductor H⁴ to the starter C²; and opening of switch 44 will not stop accumulator A¹ so long as switch 62 is closed, since current will continue to be supplied to motor starter C¹ by the branch conductor H⁵. Thus, it is assured that each accumulator will continue to run, even through filled to its full capacity, if there be a conveyor which is running and operative to receive articles from the filled accumulator.

While one desirable circuit arrangement has herein been shown, it is to be understood that the invention is not necessarily limited to the employment of a circuit of this exact type.

It should also be understood that whereas, as illustrated in FIG. 1, four accumulators have been arranged in series so that each one delivers to the next in succession, a greater or lesser number of accumulators may be employed according to the requirements of the particular situation; and likewise, while the last accumular A⁴ is shown as delivering to a duplex conveyor device B, which in turn delivers to two filing and packing devices, the feeder conveyor device B may comprise a single conveyor and arranged to deliver all of the articles flowing through the system to a single processing unit or, for example, to a combiner such as that of the copending application above referred to; and it is to be understood that all modifications and rearrangements and utilities of the accumulator here shown and/or the method of controlling the flow of articles, which fall within the terms of the appended claims, are to be regarded as within the scope of the invention.

I claim:

1. In combination, in a conveyor system, wherein articles move from a supply toward a receiving device, a conveyor which normally advances an uninterrupted stream of articles, an accumulator to which said conveyor delivers the articles and which is operative to accumulate articles received from the supply during intervals in which the receiving device cannot accommodate them at the rate supplied, said accumulator comprising a main conveyor for moving articles along a normal path, a plurality of auxiliary conveyors parallel to said main conveyor, moving in the same direction, and whose article-supporting surfaces are in the same plane as that of the main conveyor, means for moving the auxiliary conveyors more slowly than the main conveyor, means operative to distribute articles crowded off of the main conveyor onto the auxiliary conveyors whenever the delivery of articles by the main conveyor, at the normal rate, is obstructed, a motor for driving the several conveyors comprised in the accumulator, a normally closed switch in the main circuit of said motor, means operative automatically to open said switch in the event that the accumulator becomes filled to capacity, and means operative to continue the supply of current to said motor thereby to keep the accumulator conveyors running so long as the receiving device is capable of taking articles delivered by the accumulator.

2. In combination, in a conveyor system wherein articles are advanced by a normally moving conveyor for delivery to a device which is normally capable of taking articles as fast as they are delivered by the conveyor, a drive motor for said conveyor, a normally closed switch in the main circuit of said drive motor, an accumulator operative to store up articles temporarily during an interval in which said device is incompetent to take articles at the rate at which they are delivered by said conveyor, said accumulator comprising a main conveyor and a motor operative to drive it at a rate sufficient to provide said device with articles at the maximum rate at which it can accommodate them, a plurality of auxiliary conveyors parallel to the main conveyor and so relatively arranged that articles may move transversely from one conveyor to the next, motor driven means for driving all of the conveyors in the same direction, means operative to distribute articles over the several auxiliary conveyors in the event that an obstruction to the delivery of articles to the receiver reduces the rate of discharge or articles by the main conveyor of the accumulator, means operative automatically to open the switch in the main circuit of the drive motor for the first-named conveyor in the event that the accumulator becomes filled to capacity so that it is incapable of taking articles from said first-named conveyor, and means operative to continue the supply of current to the motor which drives the first-named conveyor so long as the drive motor for the accumulator conveyor is in operation.

3. In combination, in a conveyor system wherein articles move from a supply toward a receiver, a conveyor which normally advances an uninterrupted stream of articles received from the supply, a series of accumulators each of which is operative to store up articles temporarily during an interval of time in which the free discharge of articles from the respective accumulator is obstructed, each accumulator comprising a main conveyor and a plurality of auxiliary conveyors parallel to the main conveyor and so relatively arranged that articles may move transversely from one conveyor to the next, each accumulator comprising a pair of fixed article-distributing deflectors, each extending diagonally across the several auxiliary conveyors of the respective accumulators, said deflectors being spaced apart lengthwise of the auxiliary conveyors and converging toward each other from the main conveyor of the respective accumulator toward that auxiliary conveyor which is most remote from the main conveyor, the several accumulators of the series being so arranged that the main conveyor of each accumulator, except the last of the series, delivers articles directly to the main conveyor of the next successive accumulator of the series, and the main conveyor of the last accumulator of the series being arranged to deliver articles for reception by the receiver, an individual drive motor for each respective accumulator and a drive motor for the receiver, a normally closed control switch in the main circuit of each of the several motors, means operative automatically to open the switch in the main circuit of any of the several motors when the device, driven by said motor, is filled to capacity with articles, and means operative to continue the supply of current to any motor whose main circuit has thus broken by the opening of the corresponding switch so long as there is an unobstructed path into which articles may be delivered by that device whose drive motor's main circuit has been broken by the opening of its control switch.

4. In combination, in a conveyor system wherein articles move from a supply toward a plurality of receivers, a supply conveyor which normally advances a continuous stream of articles received from the supply, an accumulator operative to store articles temporarily during an interval in which none of the receivers is competent to take articles at the rate at which they are offered to it, said accumulator comprising a main conveyor and a motor operative to drive said main conveyor at a rate sufficient to provide all of the receivers with articles at the maximum rate at which the collective receivers can process them, said accumulator comprising a plurality of auxiliary conveyors parallel to the main conveyor and so relatively arranged that articless may move transversely from one auxiliary conveyor to the next, said motor being operative to drive all of the conveyors of the accumulator in the same direction, a pair of fixed deflectors each extending diagonally across the several auxiliary conveyors and which are operative to distribute articles over the several auxiliary conveyors, said deflectors converging toward each other from the main conveyor toward that auxiliary conveyor which is most remote from the main conveyor, a motor-driven feeder-conveyor which receives articles from the accumulator and which distributes them for delivery to the several receivers, a normally closed switch in the main circuit of the motor which drives the feeder-conveyor, detector means operative to open said switch if articles back up on the feeder-conveyor, a normally closed switch in the main circuit of the drive motor for the accumulator, a detector responsive to the filling of the accumulator to capacity to open said last-named switch, means operative to continue the supply of current to the motor which drives the feeder-conveyor so long as at least one of the receivers will accept articles offered to it, and means operative to continue the supply of current to the drive motor of the accumulator so long as the feeder-conveyor is running.

5. In combination, in a conveyor system wherein articles received from a supply are normally advanced in an uninterrupted stream, an accumulator operative to store up articles temporarily said accumulator comprising a main conveyor and a plurality of auxiliary conveyors parallel to the main conveyor and all at one side of the main conveyor, and so relatively arranged that articles may move transversely from the main conveyor onto the next auxiliary conveyor and thence transversely from one auxiliary conveyor to the next until the accumulator is filled, all of said conveyors moving in the same direction, a pair of fixed deflectors each extending diagonally across the several auxiliary conveyors and which are operative to distribute articles over the several auxiliary conveyors, said deflectors converging toward that auxiliary conveyor which is most remote from the main conveyor, a plurality of receivers, metering conveyors which receive articles which have been discharged by the accumulator and which deliver said articles to the respective receivers, a motor for driving each respective metering conveyor, a normally closed motor-control switch in the main circuit of each of said last-named motors, means responsive to the refusal of either of said receivers to take articles offered to it, to open the motor-control switch of the corresponding motor and thereby stop that metering conveyor which delivers articles to that receiver which refuses to accept articles, a motor for driving the conveyor of the accumulator at a rate sufficient to furnish all of the several receivers with articles at the maximum rate at which the receivers collectively can process them, a normally closed switch in the circuit of the motor which drives the accumulator conveyors, a detector responsive to the filling of the accumulator to capacity to open said switch, and means operative, so long as the drive motor of any of the metering conveyors continues to operate, to maintain a supply of current to the motor which drives the accumulator.

6. The combination according to claim 5, wherein the articles are bottles, the supply is a pasteurizer, each receiver is a packer, each metering conveyor delivers articles to a filing machine from which they are discharged to a corresponding packer, and the switch which controls the motor for each metering conveyor is automatically opened when bottles are offered to the filling machine at a time when the latter is unable to accept them, the maximum speed of each respective metering conveyor being such as to present articles to the corresponding filling machine at a rate corresponding to the maximum capacity of said filling machines when in normal operation, a duplex feeder-conveyor arranged to receive bottles from the accumulator and to distribute them for delivery to the respective metering conveyors, a motor for driving the feeder-conveyor, a normally closed switch in the main circuit of said last-named motor, a detector which responds to the backing up of bottles upon the feeder-conveyor and thereby opens said last-named switch, and means operative to continue the supply of current to the drive motor for the feeder-conveyor so long as either of the metering conveyors is in operation.

7. In combination, in a conveyor system wherein articles move from a supply toward a receiver, a conveyor which normally advances an uninterrupted stream of articles, a plurality of accumulators arranged in tandem relation so that one delivers articles to the next in succession, said conveyor being arranged to deliver articles to the first of said accumulators, each of said accumulators comprising a main conveyor and means operative to drive it at a rate sufficient to provide the receiver with articles at the maximum rate at which it can assimilate them, and each accumulator comprising a plurality of auxiliary conveyors parallel to the main conveyor and so relatively arranged that articles may move transversely from one conveyor to the next, the main conveyor of one accumulator being at its right-hand side and the main conveyor of the next accumulator in the series being at its left-hand side, the accumulators being so arranged that the main conveyor of one accumulator normally discharges articles directly onto the main conveyor of the next accumulator in the series, a switch operative, in the event that the receiver refuses to take articles at the rate at which they are advanced from the supply, to break the circuit of the drive motor of the last accumulator in the series of said accumulators.

8. The combination according to claim 7, comprising means operative, in the event that any accumulator is completely filled, to break the circuit of the drive motor for said accumulator, but only in the event that the normal delivery of articles by the main conveyor of said accumulator is prevented.

9. In combination, in a conveyor system wherein articles move from a supply toward a receiver, a conveyor which normally advances an uninterrupted stream of articles, a plurality of accumulators each operative to store up articles temporarily during an interval in which the receiver is incompetent to take the articles at the rate at which they advance from the supply, each accumulator comprising a main conveyor and means operative to drive it at a rate sufficient to provide the receiver with articles at the maximum rate at which it can assimilate them, said first-named conveyor being operative to deliver articles to the main conveyor of the first accumulator, the main conveyors of successive accumulators of the series being so relatively arranged that articles are delivered by the main conveyor of one accumulator directly onto the main conveyor of the next accumulator of the series, each accumulator comprising a plurality of auxiliary conveyors parallel to the main conveyor and so relatively arranged that articles may move transversely from off of the main conveyor onto the adjacent auxiliary conveyor and thence transversely from one auxiliary conveyor to the next until the accumulator is filled, each accumulator comprising a pair of fixed article-distributing deflectors spaced apart longitudinally of its auxiliary conveyors and extending diagonally across said auxiliary conveyors, motor-driven means for driving all of the conveyors of each accumulator in the same direction, and means operative to the stop the drive motor of each respective accumulator when said accumulator is filled to capacity, but only in the event that the discharge of articles at the normal rate by the main conveyor of said accumulator is obstructed.

10. A conveyor system according to claim 9, which comprises a series of accumulators, the accumulators of the series being arranged in alternation at opposite sides of the general line of normal advance of articles, with the main conveyor of one accumulator being arranged to deliver articles directly to the main conveyor of the next accumulator of the series.

References Cited in the file of this patent

UNITED STATES PATENTS

| | | |
|---|---|---|
| 722,937 | Begg | Mar. 17, 1903 |
| 1,087,909 | Culley | Feb. 17, 1914 |
| 1,358,255 | Seufer et al. | Nov. 9, 1920 |
| 1,885,892 | Bronander | Nov. 1, 1932 |
| 2,741,379 | Stryker | Apr. 10, 1956 |
| 2,763,359 | Rose | Sept. 18, 1956 |
| 2,843,278 | Queflander | July 15, 1958 |
| 2,936,060 | Carter | May 10, 1960 |